United States Patent
Gilliland et al.

(10) Patent No.: US 11,487,585 B1
(45) Date of Patent: Nov. 1, 2022

(54) DYNAMIC LOAD BALANCING AND CONFIGURATION MANAGEMENT FOR HETEROGENEOUS COMPUTE ACCELERATORS IN A DATA CENTER

(71) Applicant: Xilinx, Inc., San Jose, CA (US)

(72) Inventors: Spenser Gilliland, San Jose, CA (US); Andrew Mirkis, Longmont, CO (US); Fernando J. Martinez Vallina, Sunnyvale, CA (US); Ambujavalli Kesavan, San Jose, CA (US); Michael D. Allen, Broomfield, CO (US)

(73) Assignee: XILINX, INC., San Jose, CA (US)

( * ) Notice: Subject to any disclaimer, the term of this patent is extended or adjusted under 35 U.S.C. 154(b) by 336 days.

(21) Appl. No.: 15/379,153

(22) Filed: Dec. 14, 2016

(51) Int. Cl.
  *G06F 9/50* (2006.01)
  *G06F 15/78* (2006.01)
  *G06F 9/48* (2006.01)

(52) U.S. Cl.
  CPC ............ *G06F 9/505* (2013.01); *G06F 9/5044* (2013.01); *G06F 15/7867* (2013.01); *G06F 9/4843* (2013.01); *G06F 15/7889* (2013.01); *G06F 2209/508* (2013.01); *G06F 2209/5011* (2013.01)

(58) Field of Classification Search
  CPC .................... G06F 9/505; G06F 2209/5011
  See application file for complete search history.

(56) References Cited

U.S. PATENT DOCUMENTS

| | | | | |
|---|---|---|---|---|
| 6,338,130 B1* | 1/2002 | Sinibaldi | ................ | G06F 9/505 718/107 |
| 8,286,113 B1* | 10/2012 | Bridgford | ........... | G06F 17/5022 713/100 |
| 8,826,277 B2* | 9/2014 | Chang | ................ | G06F 9/45545 718/1 |
| 8,869,160 B2* | 10/2014 | Dillenberger | ........... | G06F 9/505 718/104 |
| 9,218,443 B1 | 12/2015 | Styles et al. | | |
| 9,619,261 B2* | 4/2017 | Gaurav | ............... | G06F 9/45558 |

(Continued)

FOREIGN PATENT DOCUMENTS

CN          102541657 A  *  7/2012  ............... G06T 1/20

OTHER PUBLICATIONS

Grigoras et al., "Elastic Management of Reconfigurable Accelerators," 2014 IEEE International Symposium on Parallel and Distributed Processing with Applications, 2014, pp. 174-181, doi: 10.1109/ISPA.2014.31. (Year: 2014).*

*Primary Examiner* — Abu Zar Ghaffari (74) *Attorney, Agent, or Firm* — Patterson + Sheridan, LLP (57) ABSTRACT

An example method of managing a plurality of hardware accelerators in a computing system includes executing workload management software in the computing system configured to allocate a plurality of jobs in a job queue among a pool of resources in the computer system; monitoring the job queue to determine required hardware functionalities for the plurality of jobs; provisioning at least one hardware accelerator of the plurality of hardware accelerators to provide the required hardware functionalities; configuring a programmable device of each provisioned hardware accelerator to implement at least one of the required hardware functionalities; and notifying the workload management software that each provisioned hardware accelerator is an available resource in the pool of resources.

15 Claims, 7 Drawing Sheets

(56) References Cited

U.S. PATENT DOCUMENTS

| | | | | |
|---|---|---|---|---|
| 9,817,690 B2* | 11/2017 | Feng | | G06F 9/50 |
| 9,898,315 B1* | 2/2018 | Li | | G06F 9/45558 |
| 10,255,654 B2* | 4/2019 | Mrozek | | G06F 9/4881 |
| 10,310,897 B2* | 6/2019 | Drysdale | | G06F 9/544 |
| 10,409,626 B1* | 9/2019 | Chen | | H04L 67/00 |
| 2001/0029519 A1* | 10/2001 | Hallinan | | G06F 9/5016 |
| | | | | 718/104 |
| 2007/0283358 A1* | 12/2007 | Kasahara | | G06F 9/5044 |
| | | | | 718/104 |
| 2008/0271039 A1* | 10/2008 | Rolia | | G06Q 10/06 |
| | | | | 718/105 |
| 2012/0154412 A1* | 6/2012 | Harney | | G06F 9/5011 |
| | | | | 345/522 |
| 2013/0139152 A1* | 5/2013 | Chang | | G06F 9/45558 |
| | | | | 718/1 |
| 2013/0268944 A1* | 10/2013 | Fellenstein | | G06F 9/5011 |
| | | | | 718/104 |
| 2014/0189312 A1* | 7/2014 | Tan | | G06F 9/3017 |
| | | | | 712/214 |
| 2015/0186158 A1* | 7/2015 | Yalamanchili | | G06F 9/44505 |
| | | | | 713/100 |
| 2015/0355949 A1* | 12/2015 | Bass | | G06F 9/4843 |
| | | | | 718/103 |
| 2016/0071481 A1* | 3/2016 | Chakraborty | | G06F 13/14 |
| | | | | 345/520 |
| 2016/0154681 A1* | 6/2016 | Chen | | G06F 9/5083 |
| | | | | 718/105 |
| 2016/0306772 A1* | 10/2016 | Burger | | G06F 9/5038 |
| 2017/0177396 A1* | 6/2017 | Palermo | | H04L 49/70 |
| 2018/0052709 A1* | 2/2018 | Fong | | G06F 9/5044 |
| 2018/0088174 A1* | 3/2018 | Davis | | G06F 11/3656 |
| 2018/0143854 A1* | 5/2018 | Kumar | | G06F 9/505 |
| 2018/0143860 A1* | 5/2018 | Dasu | | G06F 9/4843 |
| 2018/0150654 A1* | 5/2018 | Connor | | G09C 1/00 |
| 2018/0157511 A1* | 6/2018 | Krishnan | | G06F 9/5088 |
| 2018/0321980 A1* | 11/2018 | Lo | | G06F 9/5038 |
| 2018/0357098 A1* | 12/2018 | Dube | | G06F 9/5005 |

* cited by examiner

FIG. 7

DYNAMIC LOAD BALANCING AND CONFIGURATION MANAGEMENT FOR HETEROGENEOUS COMPUTE ACCELERATORS IN A DATA CENTER

TECHNICAL FIELD

Examples of the present disclosure generally relate to computing systems and, in particular, to dynamic load balancing and configuration management for heterogeneous compute accelerators in a data center.

BACKGROUND

Programmable devices, such as field programmable gate arrays (FPGAs), have gained a foothold in cloud and data center environments as fixed-function hardware accelerators in various applications, such as networking and storage applications. The programmable devices are included on expansion circuit boards (also referred to as expansion cards), which are deployed in specific servers for a single workload. One problem with this approach is that the accelerator cannot be easily repurposed for other workloads, which decreases its total utilization. It is desirable to provision and configure programmable device-based accelerators deployed inside a data center to handle a variety of workloads depending on instantaneous demand.

SUMMARY

Techniques for dynamic load balancing and configuration management for heterogeneous compute accelerators in a data center are described. In an example, a method of managing a plurality of hardware accelerators in a computing system includes executing workload management software in the computing system configured to allocate a plurality of jobs in a job queue among a pool of resources in the computer system; monitoring the job queue to determine required hardware functionalities for the plurality of jobs; provisioning at least one hardware accelerator of the plurality of hardware accelerators to provide the required hardware functionalities; configuring a programmable device of each provisioned hardware accelerator to implement at least one of the required hardware functionalities; and notifying the workload management software that each provisioned hardware accelerator is an available resource in the pool of resources.

Further examples include a non-transitory computer-readable storage medium comprising instructions that cause a computer system to carry out the above method, as well as a computer system configured to carry out the above method.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
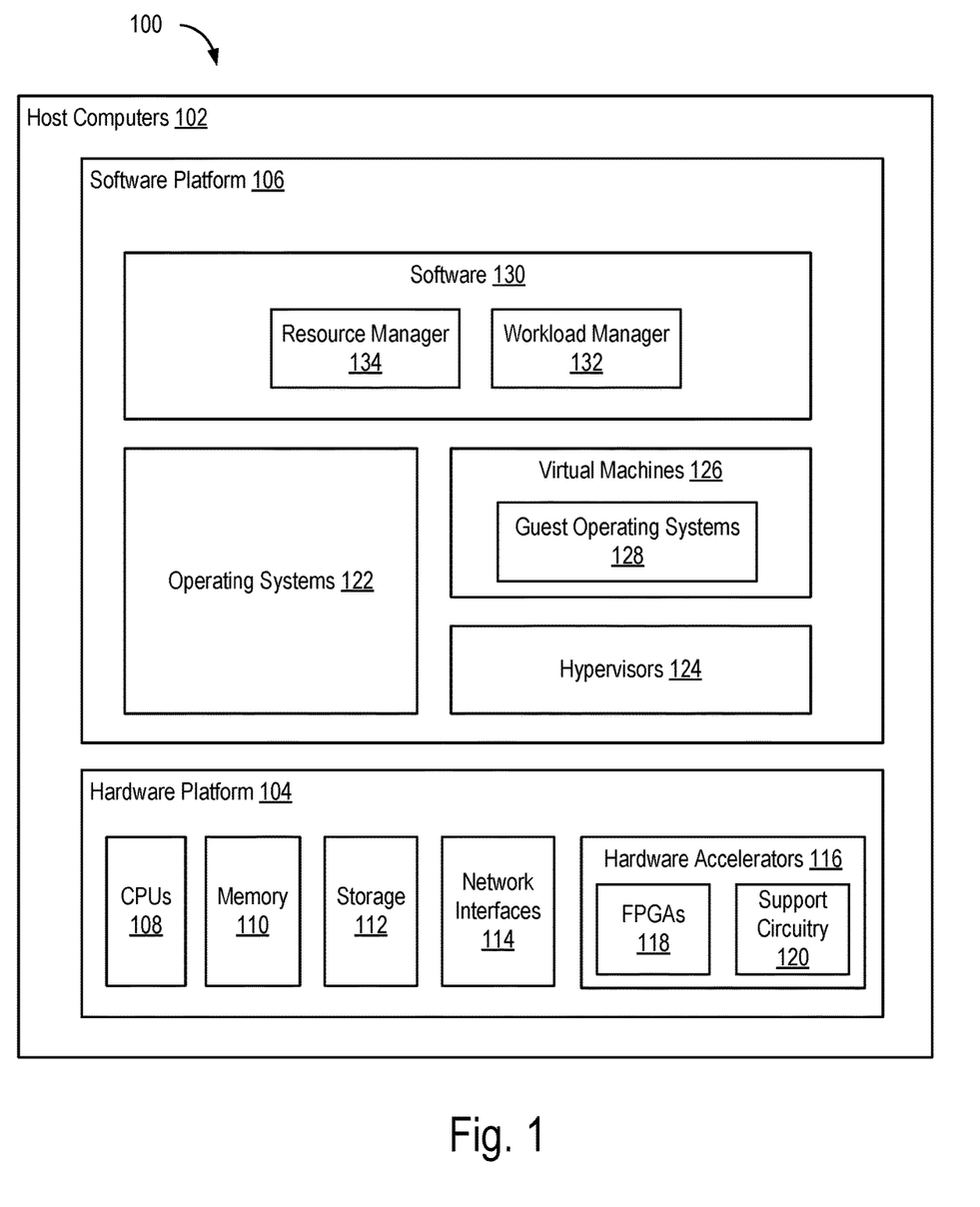
FIG. 1 is a block diagram of a data center according to an example.

FIG. 1 is a block diagram of a data center 100 according to an example. The data center 100 may be controlled and administrated by a particular enterprise or business organization ("private cloud"), operated by a cloud computing service provider ("public cloud"), or a combination thereof ("hybrid cloud"). The data center 100 includes one or more host computers 102. Each of the host computers 102 may be constructed on a server grade hardware platform 104, such as an x86 architecture platform.

In the example, the hardware platform 104 of each host 102 may include conventional components of a computing device, such as one or more processors (CPUs) 108, system memory 110, storage system 112, and one or more network interfaces 114. The CPUs 108 are configured to execute instructions, for example, executable instructions that perform one or more operations described herein and may be stored in the system memory 110 and in local storage. The system memory 110 is a device data to be stored and retrieved. The system memory 110 may include, for example, one or more random access memory (RAM) modules. The network interface(s) 114 enable each of the host computers 102 to communicate with another device via a communication medium, such as a network (not shown). Each network interface 114 may be one or more network adapters, also referred to as a Network Interface Card (NIC). The storage system 112 represents local storage devices (e.g., one or more hard disks, flash memory modules, solid state disks, and optical disks) and/or a storage interface that enables a host computer 102 to communicate with one or more network data storage systems. Examples of a storage interface are a host bus adapter (HBA) that couples a host computer 102 to one or more storage arrays, such as a storage area network (SAN) or a network-attached storage (NAS), as well as other network data storage systems.

The hardware platform 104 further includes a plurality of hardware accelerators 116. Each hardware accelerator 116 can be a circuit board or the like that is coupled to a bus for communication with the CPUs 108, the system memory 110, the storage 112, and/or the network interfaces 114 (e.g., expansion cards inserted into backplanes of the host computers 102). Each hardware accelerator 116 includes one or more programmable devices (e.g., field programmable gate arrays (FPGAs) 118) and various support circuitry 120 (e.g., memories, interface circuits, and the like). While the programmable devices are described herein as FPGAs 118, it is to be understood that other types of programmable devices can be employed (e.g., complex programmable logic devices (CPLDs) and the like). The hardware accelerators 116 are configured to provide various hardware functionalities. Example hardware functionalities include various video transcoding functionalities across different video standards and formats; various network functions for different layers and protocols; various security and encryption functionalities; various storage functionalities; and the like. The CPUs 108 can use hardware accelerators 116 to perform certain functions in hardware rather than in software.

Each host computer 102 also includes a software platform 106. The software platform 106 can include software 130 configured for execution on the hardware platform 104. The software 130 interfaces with the hardware platform 104 through operating-system (OS)-level software, such as through one or more commodity operating systems 122. In other examples, the OS-level software comprises a hypervisor 124 to supports execution of virtual machines 126. Each of the virtual machines 126 includes a guest OS 128. Thus, the software 130 on the host computers 102 can execute within operating systems 122, guest operating systems 128, or both.

The software 130 includes a resource manager 134 and a workload manager 132. The workload manager 132 is configured to distribute work (referred to herein as "jobs") across heterogeneous resources (e.g., resources of the hardware platform 104, such as CPUs 108 and hardware accelerators 116). An example of the workload manager 132 is Platform LSF ("LSF" is short for load sharing facility) commercially available from International Business Machines Corp. of Armonk, N.Y. The resource manager 134 is configured to provision and configure the hardware accelerators 116 dynamically based on the jobs being managed by the workload manager 132. Thus, the hardware accelerators 116 become dynamically reconfigurable resources, rather than fixed resources in the resource pool managed by the workload manager 132. The resource manager 134 handles the provisioning and configuration tasks and does not require core changes to the workload manager 132. The resource manager 134 monitors job demands on the resource pool managed by the workload manager 132 and makes the workload manager 132 aware of the hardware accelerators 116 on demand. The resource manager 134 can reconfigure the hardware accelerators 116 as needed to balance maximum application throughput across the resource pool.

Figure 2:
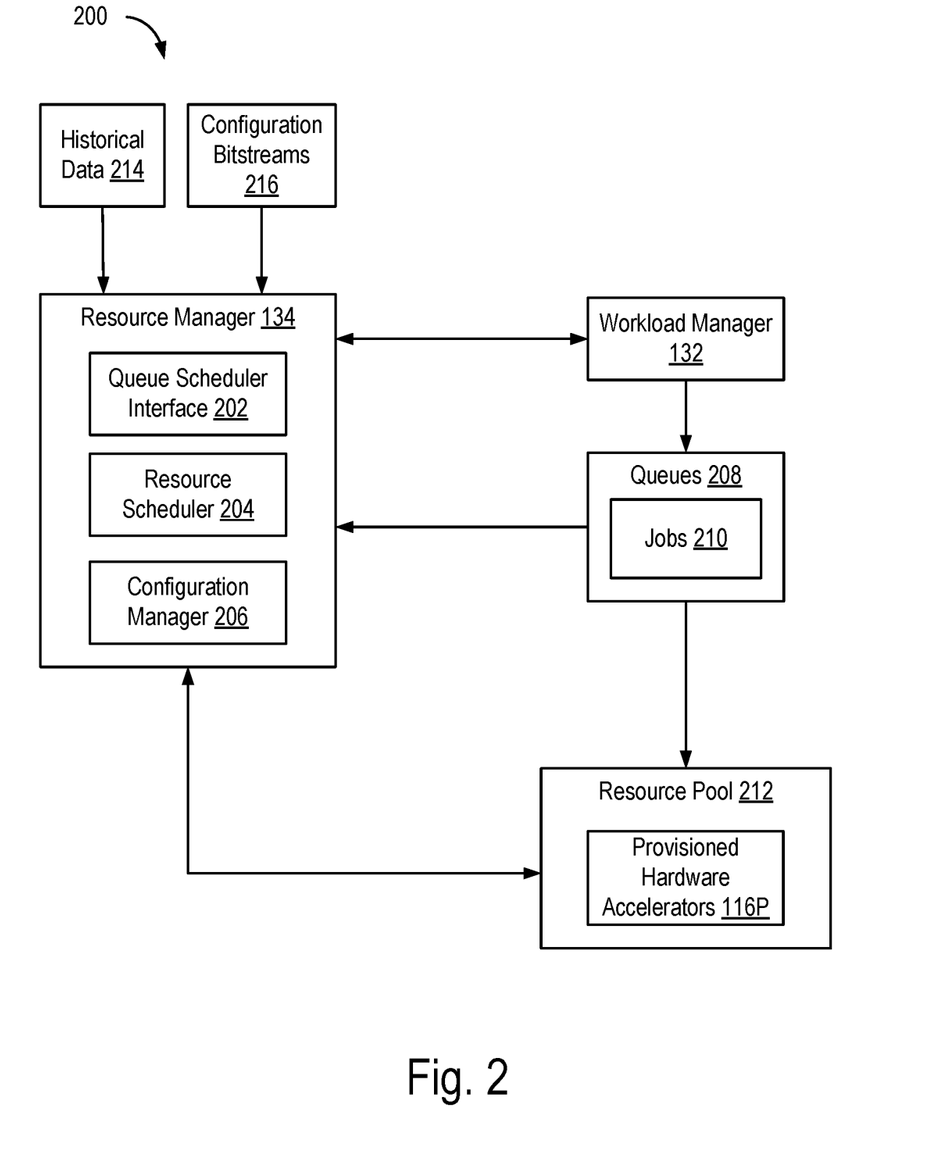
FIG. 2 is a block diagram depicting a logical view of a workload and resource management system according to an example.

FIG. 2 is a block diagram depicting a logical view of a workload and resource management system 200 according to an example. The system 200 can be implemented on the computer hosts 102 shown in FIG. 1. The system 200 includes the resource manager 134 and the workload manager 132. The workload manager 132 executes on a host computer 102 (sometimes referred to as a "master host"). Other host computers 102 or other computers external to the data center 100 submit jobs 210 to the workload manager 132. A host computer that can submit or run jobs 210 is sometimes referred to as a "server host," and a host computer that only submits jobs is sometimes referred to as a "client host." A host computer that only runs jobs is sometimes referred to as an "execution host." A host computer that only submits jobs is sometimes referred to as a "submission host."

The workload manager 132 manages a plurality of queues 208, each of which is configured to store jobs 210 to be performed. The jobs 210 wait in the queues 208 until scheduled and dispatched by the workload manager 132 for execution. The queues 208 can be implemented on one or more host computers 102 in the data center 100 (e.g., within the system memory 110).

Each job 210 comprises a workload that requires some set of computational resources. For example, a job 210 can be a command submitted to the workload manager 132 for execution. Jobs 210 can be complex problems, simulation scenarios, extensive calculations, or any other workload that requires compute power. The workload manager 132 manages a pool of resources ("resource pool 212"). The workload manager 132 determines which jobs 210 will use which computational resources in the resource pool 212. In the example, the resource pool 212 includes provisioned hardware accelerators 116P. Each provisioned hardware accelerator 116P includes some hardware functionality that can be used by the workload manager 132 to perform jobs. The resource pool 212 can include other resources, such as CPUs, graphics processing units (GPUs), and the like.

The resource manager 134 includes a queue scheduler interface 202, a resource scheduler 204, and a configuration manager 206. The queue scheduler interface 202 monitors the queues 208 to determine whether the current configuration of provisioned hardware accelerators 116P satisfies the current demand of the jobs 210. The queue scheduler interface 202 can send provisioning requests to the resource scheduler 204 to modify the pool of provisioned hardware accelerators 116P in response to requirements of the jobs 210. The resource scheduler 204 is configured to provision and configure the hardware accelerators 116P to match the requirements of the jobs 210. The resource scheduler 204 functions as a load balancer that determines how many hardware accelerators need to be in specific configurations (i.e., how many need to have specific hardware functionalities). Besides reacting to requests from the queue scheduler interface 202, the resource scheduler 204 can keep track of historical data 214. The resource scheduler 204 can use the historical data 214 to train its scheduling algorithm and improve the overall throughput of the resource pool 212 through predictive configuration of the provisioned hardware accelerators 116P. The configuration manager 206 is programmed to configure the provisioned hardware accelerators 116P with specific hardware functionalities. The configuration manager 206 can obtain configuration bitstreams from a repository ("configuration bitstreams 216").

Figure 3:
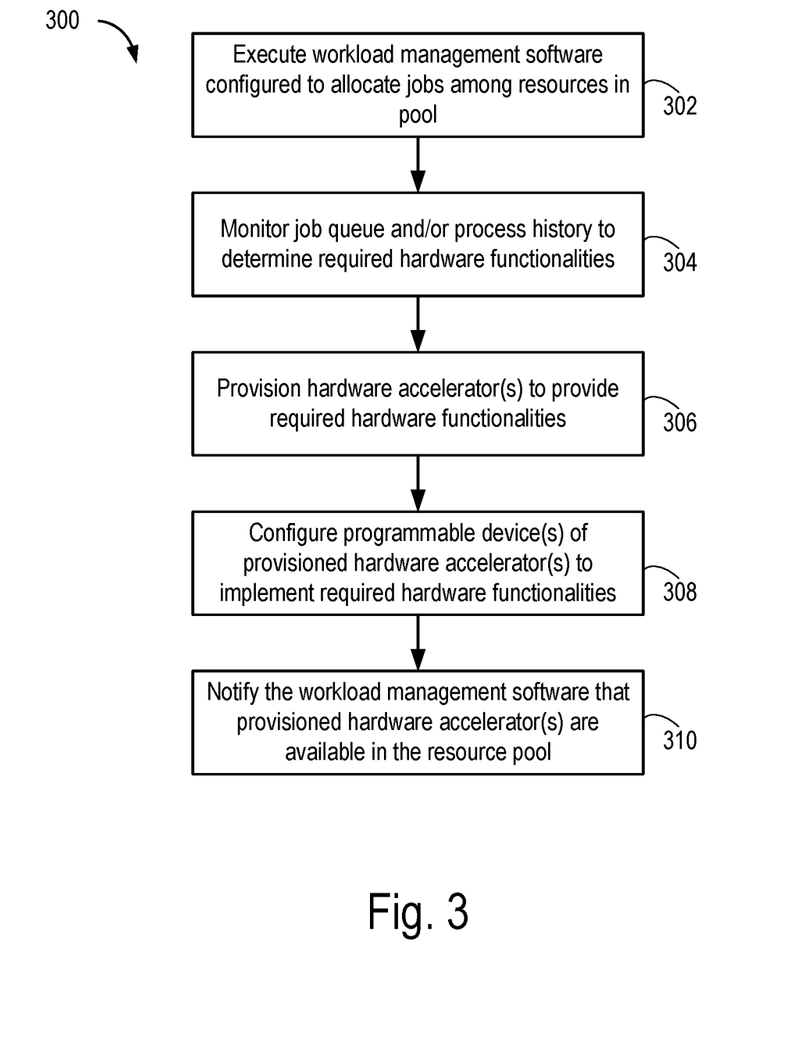
FIG. 3 is a flow diagram depicting a method of managing hardware accelerators in a computing system according to an example.

FIG. 3 is a flow diagram depicting a method 300 of managing hardware accelerators in a computing system according to an example. The method 300 begins at step 302, where an administrator executes workload management software (i.e., the workload manager 132) that is configured to allocate jobs among resources in a pool (i.e., the resource pool 212). At step 304, the queue scheduler interface 202 monitors the queues 208 to determine hardware functionalities required by the jobs 210. For example, a job might require a certain decoder or encoder, a certain hardware simulator, etc. In addition, at step 304, the resource scheduler 204 can process the historical data 214 to predict hardware functionalities that will be needed by the jobs 210. For example, the historical data 214 can specify that a particular set of hardware functionalities is needed at a particular time-of-day.

At step 306, the resource scheduler 204 provisions one or more hardware accelerators 116P to provide the required hardware functionalities identified in step 304. At step 308, the configuration manager 206 configures programmable device(s) of the provisioned hardware accelerator(s) 116P to implement the required hardware functionalities. At step 310, the queue scheduler interface 202 notifies the workload manager 132 that the provisioned hardware accelerator(s) are available in the resource pool 212.

Figure 4:
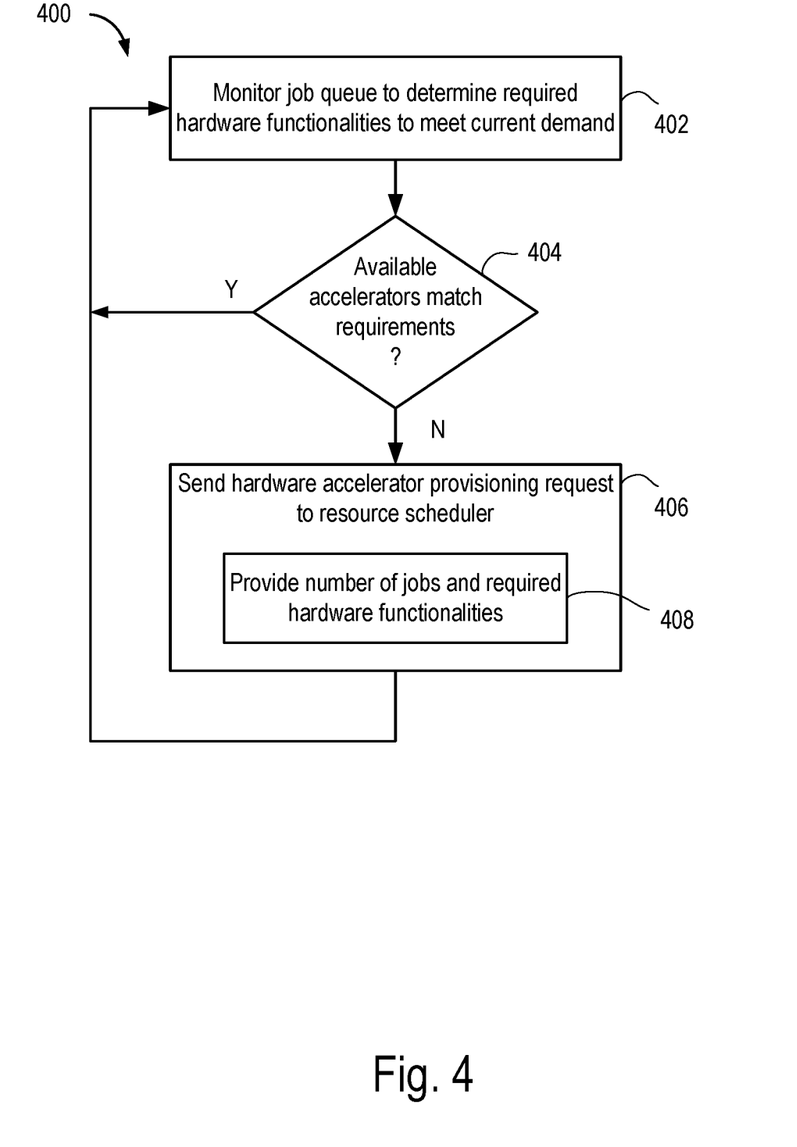
FIG. 4 is a flow diagram depicting a method of monitoring job queues of a workload manager according to an example.

FIG. 4 is a flow diagram depicting a method 400 of monitoring job queues of a workload manager according to an example. The method 400 can be performed by the queue scheduler interface 202. The method 400 begins at step 402, where the queue scheduler interface 202 monitors the queues 208 to determine required hardware functionalities to meet the current demand of the jobs 210. For example, the workload manager 132 can generate metadata for each job 210 that specifies its required hardware functionality. The queue scheduler interface 202 can process such metadata to determine the required hardware functionalities. Alternatively, the jobs 210 themselves can identify required hardware functionalities. In yet another alternative, the queue scheduler interface 202 can maintain a database of required hardware functionalities for different types of jobs.

At step 404, the queue scheduler interface 202 determines whether the provisioned hardware accelerators 116P match the required hardware functionalities of the jobs 210 in the queues 208. In an example, the queue scheduler interface 202 can access a database of the currently provisioned hardware accelerators and their current configurations maintained by the resource scheduler 204. Alternatively, the queue scheduler interface 202 can maintain its own database currently provisioned hardware accelerators and their current configurations. If the current set of provisioned hardware accelerators meets the requirements, the method 400 returns to step 402. Otherwise, the method 400 proceeds to step 406.

At step 406, the queue scheduler interface 202 sends a hardware accelerator provisioning request to the resource scheduler 204. For example, at step 408, the queue scheduler interface 202 can provide the number of jobs and the required hardware functionalities to the resource scheduler 204 in the provisioning request. The method 400 returns to step 402 and continues monitoring.

Figure 5:
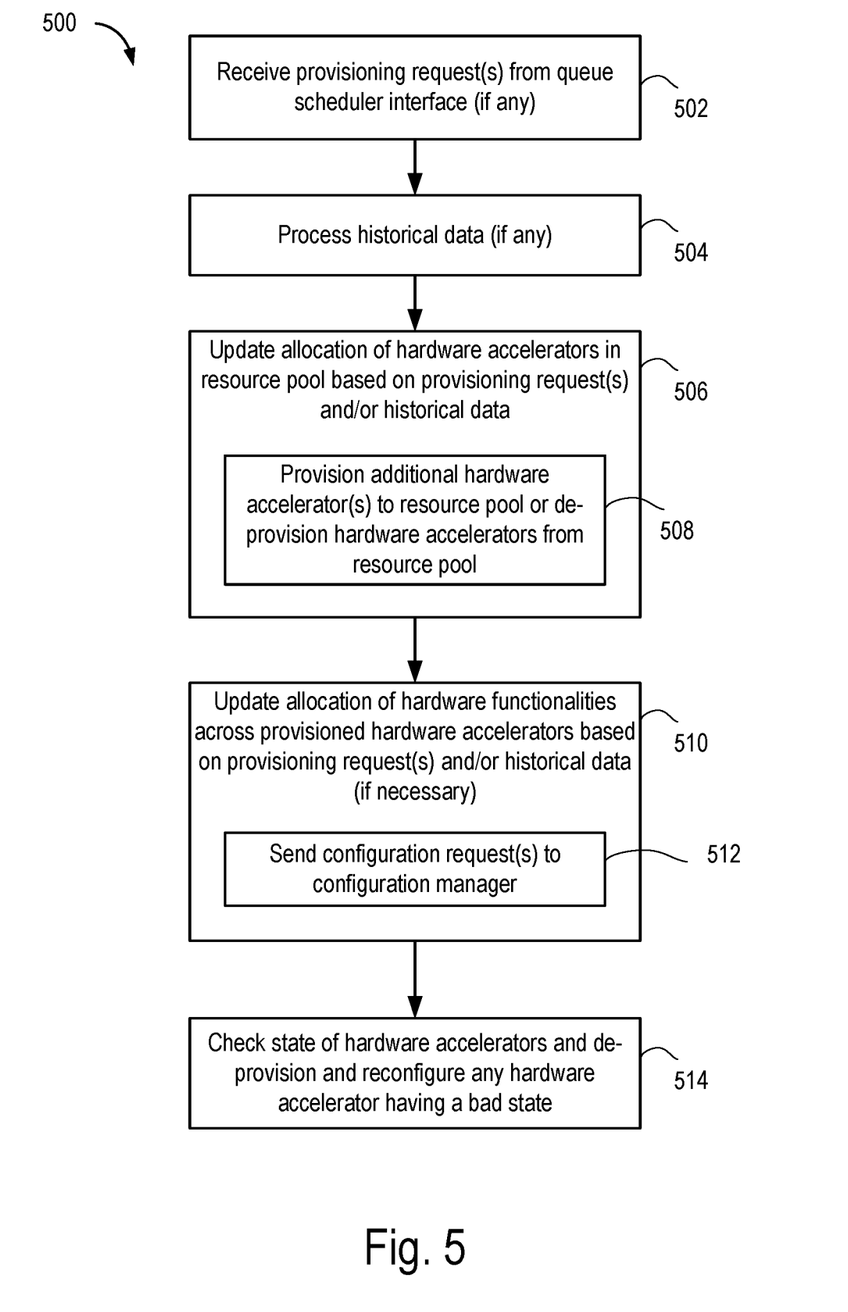
FIG. 5 is a flow diagram depicting a method of resource scheduling for hardware accelerators according to an example.

FIG. 5 is a flow diagram depicting a method 500 of resource scheduling for hardware accelerators according to an example. The method 500 can be performed by the resource scheduler 204. The method 500 begins at step 502, where the resource scheduler 204 receives one or more provisioning requests from the queue scheduler interface 202. At step 504, the resource scheduler 204 processes any historical data 214. The resource scheduler 204 can perform step 502 or step 504 or both of steps 502 and 504.

At step 506, the resource scheduler 204 updates the allocation of hardware accelerators in the resource pool 212 based on the provisioning request(s) and/or the historical data 214. For example, at step 508, the resource scheduler 204 provisions additional hardware accelerator(s) to the resource pool 212 or de-provisions hardware accelerators from the resource pool 212. For example, a provisioning request can indicate that additional hardware accelerators are needed to handle the current set of jobs 210 in the queues 208. Alternatively, the historical data 214 can indicate that additional hardware accelerators will likely be needed at a certain time. For example, the historical data 214 can indicate that, at a certain time, there is likely to be a certain number of jobs that require certain hardware functionalities requiring a certain number of additional hardware accelerators. In such cases, the resource scheduler 204 can expand the pool of provisioned hardware accelerators 116P with additional hardware accelerators 116. In another example, the historical data 214 can indicate that the demand for hardware accelerators is likely to decrease at a certain time. For example, the historical data 214 can indicate that, after a certain time, the demand for additional hardware accelerators by the jobs is likely to decrease allowing for the removal of a certain number of hardware accelerators from the resource pool. In such case, the resource scheduler 204 can remove hardware accelerators from the provisioned hardware accelerators 116P.

At step 510, the resource scheduler 204 updates the allocation of hardware functionalities across the provisioned hardware accelerators 116P based on the provisioning request(s) and/or historical data (if necessary). For example, the resource scheduler 204 may have added additional hardware accelerators to the provisioned hardware accelerators 116P in step 506 that are either un-configured or need to be reconfigured. In another example, even if additional hardware accelerators have not been added, the resource scheduler 204 can determine that allocation of hardware functionalities needs to change in order to meet the requirements of the jobs 210 in the queues 208 or the predicted requirements specified in the historical data 214. In an example, at step 512, the resource scheduler 204 sends configuration request(s) to the configuration manager 206 to configure/reconfigure programmable device(s) of certain hardware accelerators (if required). The resource scheduler 204 can repeat the method 500 over time to manage the pool of provisioned hardware accelerators 116P for use by the workload manager 132.

At step 514, the resource scheduler 204 checks the state of the provisioned hardware accelerators 116P. For example, the resource scheduler 204 can ping the hardware platform 104 and/or the hardware accelerators 116 on of the hardware platform 104 to ensure that the hardware accelerators 116 are accessible by the workload manager 132 and are functioning properly. If the resource scheduler 204 detects that a given provisioned hardware accelerator 116P is in an error state, the resource scheduler 204 can de-provision the affected hardware accelerator from the resource pool 212. The resource scheduler 204 can also attempt to reconfigure the affected hardware accelerator by sending a configuration request to the configuration manager.

Figure 6:
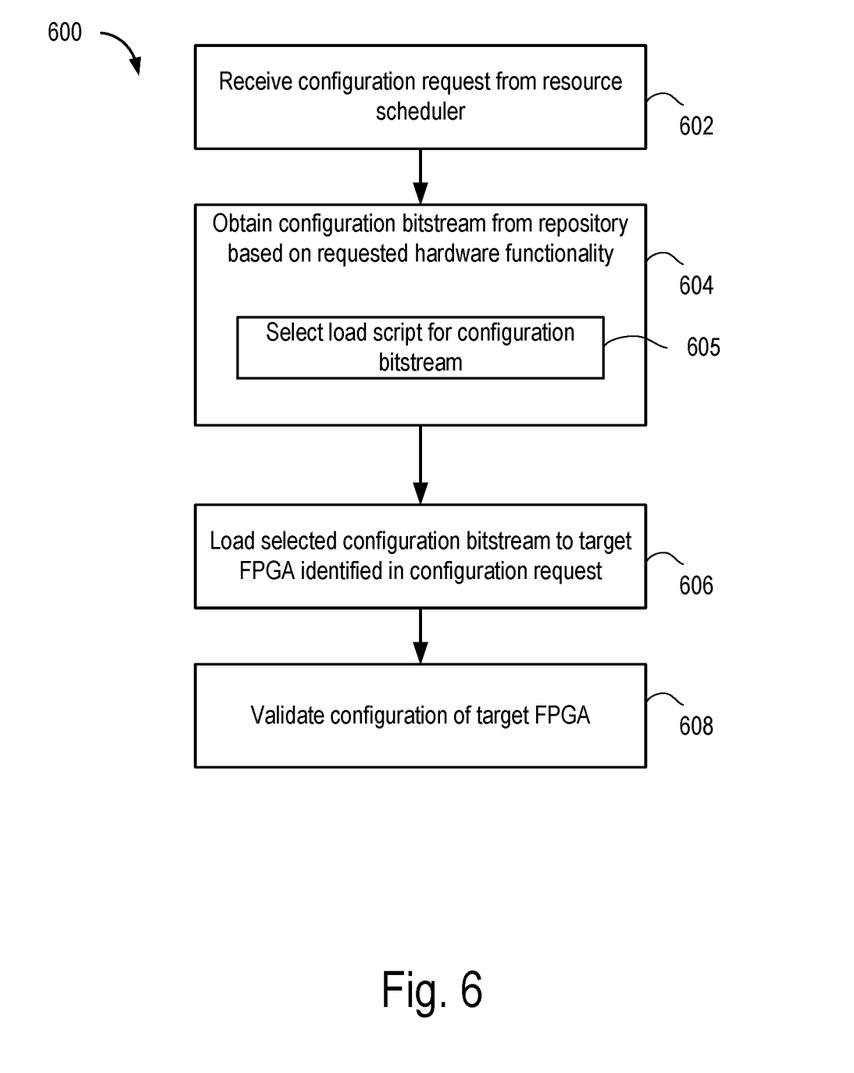
FIG. 6 is a method of configuring programmable devices of hardware accelerators according to an example.

FIG. 6 is a method 600 of configuring programmable devices of hardware accelerators according to an example. The method 600 can be performed by the configuration manager 206. The method 600 begins at step 602, where the configuration manager 206 receives a configuration request from the resource scheduler 204. At step 604, the configuration manager 206 obtains a configuration bitstream from the repository 216 based on the requested hardware functionality. At step 605, the configuration manager 206 can select a load script for the configuration bitstream. In some examples, different hardware accelerators can require different sets of commands/actions to load configuration bitstreams to the programmable devices. In addition, different bitstreams can require different actions to load to the same hardware accelerator. Thus, the configuration manager 206 can select a particular load script from a plurality of load scripts that is appropriate for loading the selected bitstream to a target programmable device (e.g., an FPGA) on a target hardware accelerator identified in the configuration request At step 606, the configuration manager 206 loads the selected configuration bitstream to a target programmable device (e.g., an FPGA) identified in the configuration request. At step 608, the configuration manager 206 validates the configuration of the target programmable device. The configuration manager 206 can repeat the method 600 to configure/reconfigure any number of programmable devices on any number of hardware accelerators in response to any number of configuration requests.

Figure 7:
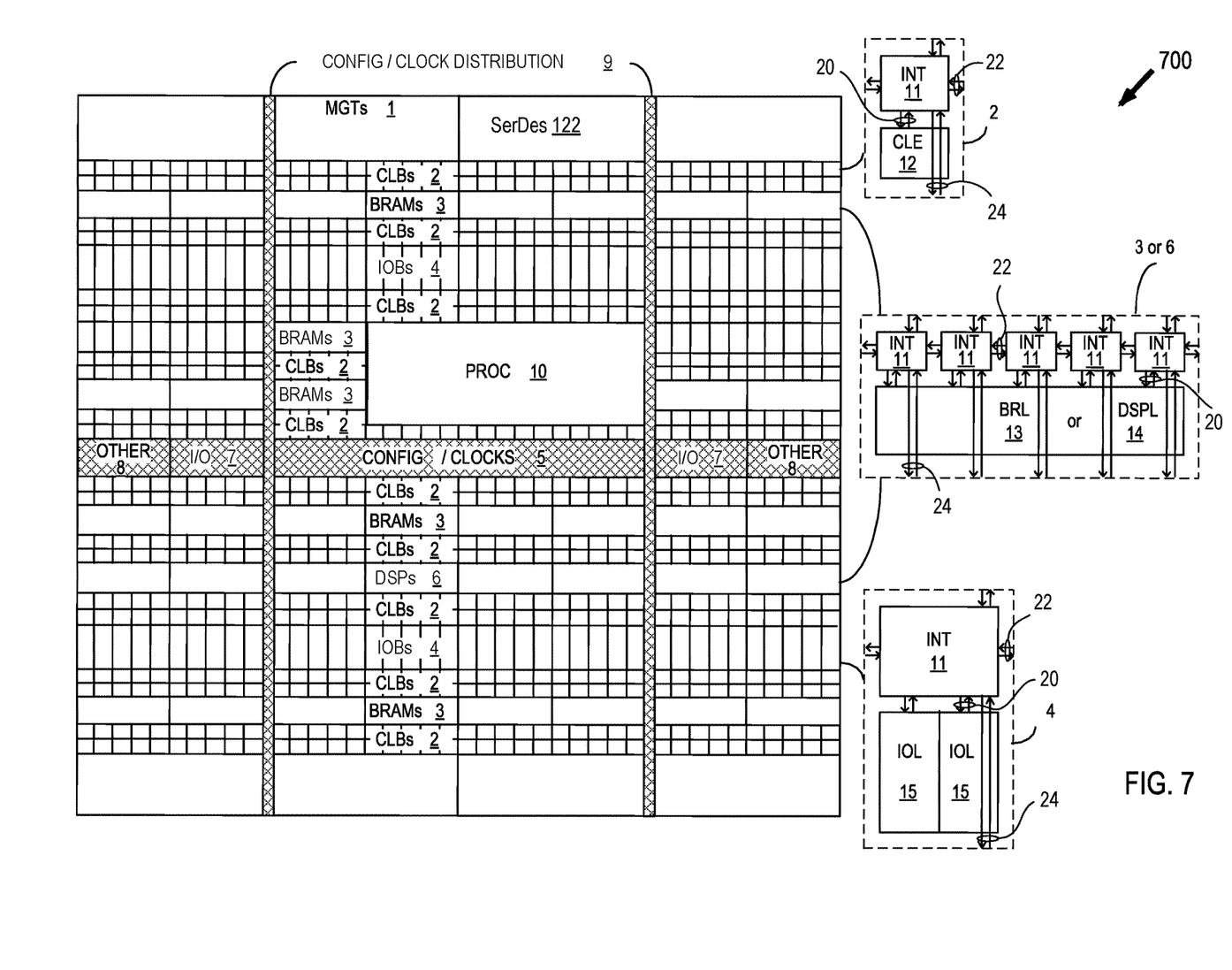
FIG. 7 illustrates an architecture of a field programmable gate array (FPGA) according to an example.

FIG. 7 illustrates an architecture of an FPGA 700 that includes a large number of different programmable tiles including configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10. The IOBs 4 are disposed around the periphery of the programmable fabric of the CLBs 2, BRAMs 3, etc. The FPGAs 118 in the hardware accelerators 116 can have the same or similar architecture as shown in FIG. 7.

In some FPGAs, each programmable tile can include at least one programmable interconnect element ("INT") 11 having connections to input and output terminals 20 of a programmable logic element within the same tile, as shown by examples included at the top of FIG. 10. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An 10B 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method of managing a plurality of hardware accelerators in a computing system, comprising:

predictively provisioning a plurality of hardware accelerator boards from a pool of resources in the computing system by predicting hardware functionalities based on historical data and provisioning the plurality of hardware accelerator boards based on the predicted hardware functionalities, wherein each hardware accelerator board comprises one or more programmable devices and one or more hardware functionalities specific to the hardware accelerator board, wherein the one or more hardware functionalities satisfies the predicted hardware functionalities;

executing workload management software in the computing system configured to receive and allocate a plurality of jobs in a job queue to the plurality of provisioned hardware accelerator boards based on the one or more hardware functionalities of each of the plurality of provisioned hardware accelerator boards;

monitoring the job queue to determine whether a configuration of the one or more hardware functionalities of the plurality of provisioned hardware accelerator boards satisfies required hardware functionalities for the plurality of jobs;

in response to determining the configuration does not satisfy the required hardware functionalities, modifying the plurality of provisioned hardware accelerator boards to satisfy the required hardware functionalities for the plurality of jobs by provisioning at least one additional hardware accelerator board from the pool of resources to implement the required hardware functionalities, wherein the at least one additional hardware accelerator board was not predictively provisioned;

after provisioning the at least one additional hardware accelerator board, configuring the one or more programmable devices of each provisioned hardware accelerator board, as well as the at least one additional hardware accelerator board, to implement at least one of the required hardware functionalities;

after configuring the one or more programmable devices, notifying the workload management software that each provisioned hardware accelerator board is an available resource in the pool of resources for allocation of the plurality of jobs in the job queue; and validating the configuration of the one or more programmable devices of each provisioned hardware accelerator board prior to the notifying the workload management software.

2. The method of claim 1, wherein the computing system further comprises a plurality of free hardware accelerator boards not part of the pool of resources, and wherein modifying the plurality of provisioned hardware accelerator boards comprises:

determining that the pool of resources does not include an available hardware accelerator board that satisfies the required hardware functionalities; and selecting at least one of the plurality of free hardware accelerator boards to provision into the plurality of provisioned hardware accelerator boards to provide the required hardware functionalities.

3. The method of claim 1, wherein the configuring comprises:

removing at least one of the hardware accelerator boards from the pool of resources; and reconfiguring the one or more programmable devices of each removed hardware accelerator board to implement at least one of the required hardware functionalities.

4. The method of claim 1, wherein the configuring comprises:

loading a configuration bitstream to each provisioned hardware accelerator board selected from a plurality of configuration bitstreams.

5. The method of claim 1, further comprising:

maintaining the historical data tracking the required hardware functionalities for the plurality of jobs over time.

6. A non-transitory computer-readable medium having instructions stored thereon, which when executed by a processor cause the processor to perform a method of managing a plurality of hardware accelerator boards in a computing system, comprising:

predictively provisioning the plurality of hardware accelerator boards from a pool of resources in the computing system by predicting hardware functionalities based on historical data and provisioning the plurality of hardware accelerator boards based on the predicted hardware functionalities, wherein each hardware accelerator board comprises one or more programmable devices and one or more hardware functionalities specific to the hardware accelerator board, wherein the one or more hardware functionalities satisfies the predicted hardware functionalities;

executing workload management software in the computing system configured to receive and allocate a plurality of jobs in a job queue to the plurality of provisioned hardware accelerator boards based on the one or more hardware functionalities of each of the plurality of provisioned hardware accelerator boards;

monitoring the job queue to determine whether a configuration of the one or more hardware functionalities of the plurality of provisioned hardware accelerator boards satisfies required hardware functionalities for the plurality of jobs;

in response to determining the configuration does not satisfy the required hardware functionalities, modifying the plurality of provisioned hardware accelerator boards to satisfy the required hardware functionalities for the plurality of jobs by provisioning at least one additional hardware accelerator board from the pool of resources to implement the required hardware functionalities, wherein the at least one additional hardware accelerator board was not predictively provisioned;

after provisioning the at least one additional hardware accelerator board, configuring the one or more programmable devices of each provisioned hardware accelerator boards, as well as the at least one additional hardware accelerator board, to implement at least one of the required hardware functionalities; and after configuring the one or more programmable devices, notifying the workload management software that each provisioned hardware accelerator board is an available resource in the pool of resources for allocation of the plurality of jobs in the job queue; and validating the configuration of the one or more programmable devices of each provisioned hardware accelerator board prior to the notifying the workload management software.

7. The non-transitory computer-readable medium of claim 6, wherein the computing system further comprises a plurality of free hardware accelerator boards not part of the pool of resources, and wherein the modifying the plurality of provisioned hardware accelerator boards comprises:

determining that the pool of resources does not include an available hardware accelerator board that satisfies the required hardware functionalities; and selecting at least one free hardware accelerator boards from the plurality of free hardware accelerator boards to provision into the plurality of provisioned hardware accelerator boards to provide the required hardware functionalities.

8. The non-transitory computer-readable medium of claim 6, wherein the configuring comprises:

removing at least one of the hardware accelerator boards from the pool of resources; and reconfiguring the one or more programmable devices of each removed hardware accelerator board to implement at least one of the required hardware functionalities.

9. The non-transitory computer-readable medium of claim 6, wherein the configuring comprises:

loading a configuration bitstream to each provisioned hardware accelerator board selected from a plurality of configuration bitstreams.

10. The non-transitory computer-readable medium of claim 6, further comprising:

maintaining the historical data tracking the required hardware functionalities for the plurality of jobs over time.

11. A computer system, comprising:

a hardware platform having a central processing unit (CPU), a memory, and a pool of resources including a plurality of hardware accelerator boards, wherein each hardware accelerator board comprises one or more programmable devices and one or more hardware functionalities specific to the hardware accelerator board; and a software platform having a workload manager configured to allocate a plurality of jobs among the plurality of hardware accelerator boards and a resource manager, the resource manager being executable by the CPU to manage the plurality of hardware accelerator boards by:

predictively provisioning the plurality of hardware accelerator boards from the pool of resources in the computer system by predicting hardware functionalities based on historical data and provisioning the plurality of hardware accelerator boards based on the predicted hardware functionalities, wherein the one or more hardware functionalities of the plurality of hardware accelerator boards satisfies the predicted hardware functionalities;

executing workload management software in the computer system configured to receive and allocate the plurality of jobs in a job queue to the plurality of provisioned hardware accelerator boards based on the one or more hardware functionalities of each of the plurality of provisioned hardware accelerator boards;

monitoring the job queue to determine whether a configuration of the one or more hardware functionalities of the plurality of the provisioned hardware accelerator boards satisfies required hardware functionalities for the plurality of jobs;

in response to determining the configuration does not satisfy the required hardware functionalities, modifying the plurality of provisioned hardware accelerator boards to satisfy the required hardware functionalities for the plurality of jobs by provisioning at least one additional hardware accelerator board from the pool of resources to implement the required hardware functionalities, wherein the at least one additional hardware accelerator board was not predictively provisioned;

after provisioning the at least one additional hardware accelerator board, configuring the one or more programmable devices of each provisioned hardware accelerator board, as well as the at least one additional hardware accelerator board, to implement at least one of the required hardware functionalities;

after configuring the one or more programmable devices, notifying the workload management software that each provisioned hardware accelerator board is an available resource in the pool of resources for allocation of the plurality of jobs in the job queue; and validating the configuration of the one or more programmable devices of each provisioned hardware accelerator board prior to the notifying the workload management software.

12. The computer system of claim 11, wherein the hardware platform further comprises a plurality of free hardware accelerator boards not part of the pool of resources, and wherein the resource manager is configured to:

determine that the pool of resources does not include an available hardware accelerator that satisfies the required hardware functionalities; and select at least one of the plurality of free hardware accelerator boards to provision into the plurality of provisioned hardware accelerator boards to provide the required hardware functionalities.

13. The computer system of claim 11, wherein the resource manager is configured to:

remove at least one of the hardware accelerator boards from the pool of resources; and reconfigure the one or more programmable devices of each removed hardware accelerator to implement at least one of the required hardware functionalities.

14. The computer system of claim 11, wherein the resource manager is configured to:

load a configuration bitstream to each provisioned hardware accelerator board selected from a plurality of configuration bitstreams.

15. The computer system of claim 11, wherein the resource manager is configured to:

maintain the historical data tracking the required hardware functionalities for the plurality of jobs over time.

* * * * *